United States Patent Office 3,406,228
Patented Oct. 15, 1968

3,406,228
METHOD OF PRODUCING EXTREMELY FINELY-DIVIDED OXIDES
John E. Hardy, Andover, and Merrill E. Jordan, Walpole, Mass., assignors to Cabot Corporation, Boston, Mass., a corporation of Delaware
No Drawing. Filed June 17, 1964, Ser. No. 375,942
19 Claims. (Cl. 264—.5)

ABSTRACT OF THE DISCLOSURE

The present invention relates to a novel process for the production of metal oxide powders of extremely small particle size. Broadly, said process is characterized by the formation of a liquid slurry comprising a liquid medium, a metal compound and carbon black. Said slurry is spray dried and the resulting powder is heat treated in order to convert the metal compound to the corresponding metal oxide.

---

Finely-divided metal oxide powders are well known products of commerce. Such products presently have many known specialized applications and their potential applications are regarded as especially promising. Many processes are known for producing such metal products and in general, the fineness of the ultimate product is primarily determined by the process utilized. For example, the most finely-divided products such as those having average particle diameters below about 0.1 micron are produced by elaborate and highly specialized ball milling techniques and also by vaporization or fuming techniques. Accordingly the most finely-divided metallurgical products are rather expensive because of the intricate processes involved in producing them. In view of the growing need for meallurgical products having average particle diameters below about 0.1 micron, any process whereby such products of uniform quality may be produced consistently, easily and in a simple and inexpensive fashion would be indeed a notable contribution to the art.

A principal object of the present invention is to provide an improved process for making the foregoing contribution to the art.

A more specific object of the present invention is to produce metal oxides in finely-divided powder form in an extremely economical fashion.

Still another object of the present invention is to provide a simple process for producing metal oxides in a finely-divided form which oxides can be subsequently treated to produce fine powdered metal products such as those known to the art as carbides, cermets and the like.

Another specific object of the present invention is to provide a process for producing metal oxides in a finely-divided powder form in combination with varying amounts of carbon which combinations have specialized properties and are of particular utility as fillers and/or as pigments in elastomeric and plastomeric compositions.

Other objects and advantages of the present invention will in part be obvious to those well skilled in the art or will in part appear hereinafter.

In a very broad sense, the above-mentioned objects and advantages are realized in accordance with the practice of our invention by mixing a finely-divided carbon black and a metal compound in a fashion which insures an especially uniform and intimate association of the ingredients at the time the resulting mixture is introduced into a high temperature environment suitable for converting the metal compound to the corresponding oxide. More precisely, the advantages which flow from the practice of our invention are realized by combining the ingredients under conditions which will insure that the ingredients will be uniformly associated with each other in a discrete generally sub-micron state. Thus, the principles of our invention reside not only in the ingredients and the form thereof utilized but also in the manner of intimately combining said ingredients to produce a mixture which can be subsequently converted in surprisingly easy fashion to an extremely finely-divided metal oxide composition wherein the particles in most cases have average particle diameters below about 0.1 micron and generally between about 0.02 and about 0.06 micron.

We have found that carbon black is an essential ingredient in effectuating the purposes of our process since the presence thereof normally permits the conversion of the metal compound to the corresponding oxide to be achieved much more rapidly or at temperatures much lower than those normally required to accomplish said conversion in the absence of carbon black. Also, the use of carbon black permits one to conveniently apply the practice of our invention to the production of diverse metallurgical products since the amount of carbon black utilized can be selectively adjusted to conform to the stoichiometric amount required to subsequently convert the metal oxide composition obtained to other finely-divided metallurgical products including carbides and free metals.

For the purposes of the present specification, and the claims attached hereto, carbon black refers generally to products produced by the incomplete combustion of hydrocarbon materials. Thus, for example, materials referred to in the art as acetylene blacks, lamp blacks, channel blacks, etc., are all included within the scope of the present invention.

The manner of combining the carbon black and the metal compound is similarly considered especially critical since it contributes to the overall advantages to be derived from the practice of our invention. For example, we have found pronounced differences in the physical properties of intermediate mixtures similar to ours but which have been produced by combining the starting ingredients in a different manner. More specifically, we have found that the X-ray diffraction pattern of our uniform mixtures of carbon black and metal compound differs quite distinctly from that of an identical mixture not obtained in accordance with the teachings of our invention. The most striking difference between said patterns is that the crystallinity of our mixture is greatly suppressed. We are unable to explain precisely why our manner of combining the carbon black and metal compound produces a mixture having reduced or suppressed crystallinity but we believe that this difference in crystallinity is a significant factor.

The advantages of the use of lower thermal conversion temperatures and/or shorter reaction times in producing finely-divided metal oxide compositions will be obvious to those skilled in the art. For example, lower conversion temperatures and shorter residence time of reactants in a conversion zone obviously imply many economic advantages in both the design of apparatus and operation. Even more importantly, lower temperatures and shorter residence time also minimize sintering thus tending to produce a fine particle sized end product. Accordingly, we are enabled to present a highly versatile and an especially simple and economical process for producing diverse metal oxide compositions in an extremely finely-divided form, which compositions have heretofore been produced only by highly elaborate, intricate and/or expensive techniques.

In accordance with a preferred embodiment of our invention, a soluble or dispersible metal compound is dissolved or uniformly dispersed in a slurry or dispersion of carbon black and the resulting dispersion is thereafter spray dried to produce extremely uniform dry particles comprising the starting ingredients.

Spray drying is quite different from conventional drying processes. For example, conventional drying of mixtures of a metal compound and carbon black proceeds by way of evaporation of the liquid from the surface of the presscake and the continuous replacement of this surface water by capillary movement of moisture from the internal portions thereof. Such uneven drying normally gives rise to agglomerates which are non-uniform in both size and composition. In spray drying, however, evaporation takes places from small uniform droplets surrounded by warm gases. Under such conditions, the resulting dry particles are normally relatively uniform in size and equally importantly have a uniform composition. In existing commercial spray drying equipment, the powdered product obtained by spray drying a solution or slurry is normally characterized by uniform spherical particles which are usually of a hollow or porous nature and of uniform particle size. In general, the average particle size of the dried product ranges between about 20 and 60 microns. The relatively small particle size of the spray dried product is another factor which is considered important. A more complete description of the details of commercial spray drying systems can be found in "Design and Use of Spray Dryers," pages 83–88 of Chemical Engineering, Sept. 30, 1963. It is to be understood however, that the practice of our invention is not restricted solely to the processes and apparatus set forth in the aforesaid article. Instead, by "spray drying," we mean—and intend to include within the scope of the present invention—those drying processes wherein a slurry is subdivided into and maintained as discrete, preferably uniform droplets while conducted through a zone heated to a temperature sufficient to dry same; especially included are those drying processes in which the average particle size of the dried product is no greater than about 200 microns.

Broadly, the metal compounds utilized in the practice of our invention include compounds of metals such as boron, silicon, barium, copper, aluminum, titanium, zirconium, tungsten, zinc, lead, tin, iron, cobalt, nickel, manganese, chromium, vanadium, thorium, molybdenum and mixtures of these. More specifically, however, the present invention relates to metal compounds which can be thermally decomposed or converted in the presence of oxygen or in an inert atmosphere to produce the corresponding oxide. Especially preferred are the water soluble or water dispersible organic and inorganic compounds of the above-mentioned metals. Representative preferred compounds include the sulfates, chlorides, bromides, iodides, fluorides, perchlorates, orthoarsenates, sulfides, acetates, citrates, oxalates, formates, benzoates, carbonates, oleates, and tartrates of the above-mentioned metals. The benefits which flow from the practice of our invention are especially apparent when compounds of the above-mentioned metals which have decomposition temperatures above about 500° F. but below about 2000° F. are utilized. Thus, such compounds constitute an especially preferred embodiment of our invention.

The exact amount of carbon black to be combined with any of the above-mentioned metal compounds will be determined primarily by the composition desired and to some extent by the particular carbon black utilized. We consider our process most valuable when applied to the production of finely-divided metal oxide compositions of high purity, that is to say, metal oxide compositions containing very small quantities of carbon black, i.e. containing less than about 10% by weight of the total composition of carbon black. Accordingly, in the most preferred embodiment of our invention, the amount of carbon black utilized initially will rarely exceed the amount required to produce compositions comprising about 10% by weight carbon black.

However, it is to be understood that our process can also be applied to the production of finely-divided metal oxide compositions comprising larger amounts of carbon black. Such compositions can be utilized as fillers in elastomeric or plastomeric compositions and accordingly can contain up to about 90% by weight of carbon black if desired. Also, compositions containing varying amounts of carbon blacks can be further treated at more elevated temperatures to produce finely-divided metal or carbide powders in an essentially pure form or in combination with varying amounts of carbon black. For example, the amount of carbon black utilized originally can be selected to include sufficient carbon black so that treatment at more elevated temperatures in selected environments will convert the metal oxide to the free metal or the carbide or to any mixture of oxide, free metal and/or carbide.

When the ultimate product is to be a metal oxide composition essentially free of carbon back, some care must be taken in selecting the minimum amount of carbon black to be combined with the metal compound. Our results indicate that the minimum amount of carbon black that can be efficiently utilized appears to be related in an inverse fashion to the surface area of the carbon black utilized, i.e. the larger the surface area of the carbon black the lesser the amount required under otherwise identical conditions. The following example illustrates the effect of the surface area of the carbon black utilized on the minimum amount thereof required.

EXAMPLE 1

Two intermediate mixtures were prepared by carefully mixing in each case an aqueous dispersion of carbon black and an aqueous solution of nickel sulfate and spray drying the resulting dispersion at an inlet temperature of about 320° F. and an outlet temperature of about 220° F. to produce dry spherical particles having an average diameter of about 20–40 microns. In each case, the proportion of carbon black dispersion to nickel sulfate solution utilized was adjusted so that the resulting dry particles consisted of about 1% by weight carbon black. The only difference between the two mixtures was that in one mixture Vulcan 3, a relatively high surface area furnace carbon black produced by Cabot Corporation was utilized whereas in the other mixture Sterling MT, a low surface area thermal carbon black produced by Cabot Corporation was utilized. A sample of each mixture was subjected to a temperature of about 1500° F. for varying times in the presence of oxygen. The following table summarized the results:

TABLE I

| Black | $N_2$ surface area, $M^2/gm.$ | Percent black by wt. intermediate mixture | Temp., °F. | Time (mins.) | Percent $NiSO_4$ converted to NiO (X-ray diffraction method) |
| --- | --- | --- | --- | --- | --- |
| Vulcan 3 | 74 | 1 | 1,500 | 30 | 70 |
| Sterling MT | 6 | 1 | 1,500 | 30 | 40 |
| Vulcan 3 | 74 | 1 | 1,500 | 60 | 100 |
| Sterling MT | 6 | 1 | 1,500 | 60 | 70 |

Obviously, carbon blacks having somewhat higher surface areas than Vulcan 3 would perform even more efficiently in the practice of our invention. However, for practical purposes we consider the minimum amount of carbon black which should be utilized in accordance with the teachings of our invention to be about 1% by weight of the carbon black metal compound composition. Also for the sake of efficiency, when carbon blacks having surface areas of less than about 70 square meters per gram are utilized, the minimum amount of black used should be above about 1% by weight of the composition.

The temperature at which the metal compound in the carbon black metal compound intermediate mixture can be converted to form metal oxide can vary over a wide range. In general, the range includes temperatures substantially below those normally required to convert the metal compound as well as temperatures that can exceed said normal decomposition temperature by 400 or 500° F. and even more. The lower temperatures are of special utility when the conversion is achieved by way of batch type process. However a more efficient method of thermally converting the metal compound to the corresponding oxide is by way of a continuous process in which the dry particles comprising carbon black and metal compound are conveyed through a high temperautre conversion zone while suspended in a fluid medium. In such continuous processes, it is obviously desirable to reduce residence time to a minimum and thus the temperature of the conversion zone will be relatively high.

The environment in the conversion zone will be determined by many factors such as the amount of carbon black utilized, the conversion temperature utilized and the particular metal compound utilized. For example, if the ultimate product is to be an oxide of high purity (i.e. low carbon black content) then an oxidizing environment is definitely preferred. The oxidizing atmosphere not only insures a rapid conversion of the metal compound to the corresponding oxide but also is effective in reducing or totally removing the residual carbon in the final product. Furthermore, when the conversion temperature utilized is higher than that normally required to decompose the metal compound in the absence of any carbon black, and especially when larger amounts of carbon black are utilized, an oxidizing atmosphere is also definitely preferred since reduction or carbide forming reactions are thereby inhibited. An inert atmosphere is often suitable when the conversion temperature is closely controlled and maintained below or at about the normal decomposition temperature of the compound utilized unless, of course, the metal compound is one which cannot be decomposed to form the oxide in the absence of an oxidizing atmosphere.

The following specific examples of particular embodiments of our invention are given for the purposes of providing a fuller and more complete understanding of some of the operating details of the invention together with many of the advantages to be obtained from practicing same. These examples should be considered as illustrative only and as in no sense limiting the scope of the present invention.

Examples 2, 3 and 4, which follow are offered to demonstrate, first, in Examples 2 and 3, the criticality of utilizing carbon black and secondly, in Example 4, the criticality of our manner of combining the ingredients. It is to be understood that although only nickel sulfate is utilized in these examples, nevertheless the advantages illustrated are normally achievable with other metal compounds.

EXAMPLE 2

In order to illustrate the value of the use of carbon black, a solution of nickel sulfate was spray dried and the resulting powder collected. Also, a solution of nickel sulfate was mixed with a dispersion of Sterling MT carbon black and the resulting mixture was also spray dried. The concentration of carbon black in the dried nickel sulfate/carbon black mixture was about 3.8% by weight. A sample of each of the above powders was heated in air to 1500° F. for varying periods of time. X-ray diffraction patterns were obtained on a Phillips' X-ray diffractometer for each of the resulting products and said patterns were examined for nickel sulfate and nickel oxide peaks. The following data was obtained:

TABLE II

| Description | Temp. (° F.) | Time (mins.) | X-ray diffraction pattern analysis | |
|---|---|---|---|---|
| | | | Percent $NiSO_4$ | Percent NiO |
| Nickel sulfate and carbon black | 1,500 | 30 | 0 | 100 |
| Nickel sulfate | 1,500 | 30 | 90 | 10 |
| Do | 1,500 | 60 | 80 | 20 |
| Do | 1,500 | 360 | 50 | 50 |

It will be seen that in the presence of carbon black, the conversion of nickel sulfate to nickel oxide is complete after 30 minutes at 1500° F. whereas in the absence of carbon black, the conversion is still very much incomplete after 6 hours treatment.

In order to further illustrate the advantages to be obtained by the use of carbon black, a sample of each of the above-mentioned powders was also heated to 1800° F. for varying times. The products obtained were analyzed in the fashion described above. The following data was obtained:

TABLE III

| Description | Temp. (° F.) | Time (mins.) | X-ray diffraction pattern | |
|---|---|---|---|---|
| | | | $NiSO_4$ | NiO |
| Nickel sulfate and carbon black | 1,800 | 15 | 0 | 100 |
| Nickel sulfate | 1,800 | 15 | 40 | 60 |
| Do | 1,800 | 120 | 0 | 100 |

It is obvious from Tables II and III that not only does the carbon black aid in converting the metal compound to the oxide at temperatures lower than those normally required but also that in the presence of carbon black the rate of conversion is much more rapid even when the temperature utilized is one at which said metal compound will convert to the oxide in the absence of carbon black.

EXAMPLE 3

This example is offered to further illustrate the criticality of the presence of carbon black in practicing our invention. In this example a direct comparison is made between the times required at a temperature of 1500° F. to: (1) convert nickel sulfate to the oxide in the presence of carbon black and (2) convert nickel sulfate to the oxide in the presence of another pyrogenic product, e.g. "Cab-O-Sil," a pyrogenic silica having a surface area of about 200 m.²/gram. Each mixture was prepared in accordance with the procedure set forth in Example 2 and the concentration of carbon black and Cab-O-Sil in the respective mixtures was about 3.8% by weight of the spray dried mixture. The following data was obtained:

TABLE IV

| Description | Temp. (° F.) | Time (mins.) | Qualitative analysis | |
|---|---|---|---|---|
| | | | Percent $NiSO_4$ | Percent NiO |
| Nickel sulfate and carbon black | 1,500 | 30 | 0 | 100 |
| Nickel sulfate and silica | 1,500 | 30 | 100 | 0 |

Note that in the presence of carbon black, the nickel sulfate has been completely converted to the oxide, while in the presence of silica the nickel sulfate has not been converted.

The results of Examples 2 and 3 indicate quite clearly that carbon black carries out a unique role in decomposing or converting metal compounds more efficiently than other high surface area materials.

EXAMPLE 4

In order to illustrate the criticality in the manner of combining the metal compounds and the carbon black, Sterling MT carbon black was mixed with nickel sulfate in the manners described in Table 5 below: The amount of carbon black in each of the following mixtures was 5.6% by weight of the mixture.

TABLE V

| Mixture No. | Ingredients | Method of forming mixture |
|---|---|---|
| 1 | Nickel sulfate and carbon black. | 30 minutes by dry blending. |
| 2 | ____do____ | Nickel sulfate solution mixed with slurry of black and evaporated to dryness—"Crystallization Technique." |
| 3 | Nickel sulfate and carbon black. | Nickel sulfate solution mixed with black dispersion. Resulting mixture then spray dried. The average particle size of spray dried product was less than 44 microns. |

Portions of each of the above mixtures were heat treated at 1500° F. in air in a muffle furnace for periods of 30 minutes, and 60 and 120 minutes (where necessary). X-ray diffraction patterns were obtained on each of the resulting compositions and the patterns were examined for the presence of nickel sulfate and/or nickel oxide. The following data was obtained:

TABLE VI

| Mixture No. | Method of blending | Heating time | Temp. (° F.) | X-ray diffraction data | |
|---|---|---|---|---|---|
| | | | | Percent $NiSO_4$ | Percent NiO |
| 1 | 30 minutes rolling | 30 | 1,500 | 70 | 30 |
| 1 | ____do____ | 60 | 1,500 | 30 | 70 |
| 1 | ____do____ | 120 | 1,500 | 0 | 100 |
| 2 | Crystallization technique | 30 | 1,500 | 40 | 60 |
| 2 | ____do____ | 60 | 1,500 | 0 | 100 |
| 3 | Spray drying | 30 | 1,500 | 0 | 100 |

Table 6 demonstrates that our manner of combining the ingredients permits us to convert the metal compound to the corresponding oxide substantially more quickly; thus our manner tends to produce a product having a lower average particle diameter than can be obtained by other methods, since opportunities for sintering the product are greatly minimized.

Substantially the same results and benefits illustrated in all of the preceding examples are to be obtained when other metal compounds are utilized and when other carbon blacks are utilized. Thus, the practice of the present invention is usually applicable to the production of finely-divided oxides of such metals as boron, silicon, barium, copper, aluminum, titanium, zirconium, tungsten, zinc, lead, tin, iron, cobalt, nickel, manganese, chromium, vanadium, thorium, molybdenum, and mixtures of any of these.

The following examples are offered to illustrate the application of the teachings of our invention to the production of finely-divided metal oxide powders of commercial interest.

EXAMPLE 5

Production of ferrites

Ferrites are magnetic materials which because of their internal resistance and magnetic properties are used in the electronics field. In these applications, advantage is taken of the magnetic properties of the ferrite plus the non-conducting characteristic of the oxides which make up its composition. The composition of a ferrite can be typically represented as $MFe_2O_4$ in which M is a bivalent metal such as nickel, cobalt, zinc, manganese, copper or mixtures thereof.

The usual method employed in the production of ferrites involves the blending of the oxide constituents in their proper ratio in a liquid medium. Ball milling grinds these constituents to a small particle size and also improves the homogeneity of the mixture. The mixture, after sufficient grinding, is filtered and dried and the filter cake is then ground to a relatively fine particle size. The resulting powder is pressed into desired shapes and heat treated at a temperature sufficient to sinter the powder into a continuous mass. Normally, the foregoing method results in a product lacking in homogeneity and having large grain sizes.

One object of the present invention is to provide a means of producing ferrite powders having improved magnetic properties and greatly improved homogeneity of the finished product and fineness of sub-division of the component oxides in the composition.

The following example illustrates a manner of utilizing the teachings of our invention to produce such improved ferrite powders.

135 grams each of nickel sulfate and iron sulfate were dissolved in water and mixed with 100 grams of a 30% aqueous dispersion of a furnace carbon black. The mixture was spray dried at an inlet temperature of about 325° F. and an outlet temperature of about 220° F. The resulting spray dried powder was heat treated in a muffle furnace for 2 hours at 1200° F. The X-ray diffraction pattern of the product obtained indicated that the product was a nickel ferrite ($NiFe_2O_4$) while a cursory examination of the product under the electron microscope indicated that most of the product was in the sub-micron particle size range.

EXAMPLE 6

Production of a nickel-zinc-cobalt-ferrite

A number of materials were dissolved or dispersed in water and the resulting dispersion was spray dried at an inlet temperature of about 300° F. and an outlet temperature of about 210° F. The solids content of the formulation fed to the spray dryer was as follows:

| | Gms. |
|---|---|
| Ferric sulfate | 1060 |
| Vulcan 3 | 27 |
| Zinc sulfate | 167 |
| Nickel sulfate | 276 |
| Cobalt sulfate | 10 |

The spray dried product was heat treated to 1000° F. for 2 hours and the resulting product was evaluated. An $N_2$ surface area measurement of the product by a modified B.E.T. method indicated the surface area to be about 36 square meters per gram. Such a high surface area is indicative of a particle size in the sub-micron range. A detailed examination of the X-ray pattern revealed six peaks, in agreement with a National Bureau of Standards pattern for nickel zinc ferrite. The heat treated powder was also examined under the electron microscope. This examination indicated that a considerable portion of the product was in the sub-micron particle size range, with some particles as small as .01 micron.

EXAMPLE 7

Production of metal, metal oxide or metal carbides from waste pickle liquor

Pickling is the term given the descaling process by which the hard black oxide formed on the surface of a steel bar during hot rolling is removed by chemical action. The removal of hot rolled scale by pickling is normally performed in order to (1) prepare the surface of the bar for inspection or (2) prepare the product for ultimate end use.

In the pickling operation, the bath usually consists of 5–8% $H_2SO_4$ in water. The stock is soaked for various lengths of time. Eventually the concentration of $FeSO_4$ builds up in the bath to about 25%. At this point, the efficiency of the bath has decreased to the point where a new solution must be used. The $FeSO_4$ solution is concentrated in an evaporator and on cooling the $FeSO_4$ crystallizes out. A great quantity of $FeSO_4$ is produced in the iron and steel industry in this manner and the supply greatly outweighs the demand. The following illustrates a method of preparing useful metallic products from the waste pickle liquor in accordance with the teachings of our invention.

A spent pickling liquor containing ferrous sulfate is mixed with an aqueous dispersion of carbon black. The resulting mixture is spray dried to produce a dry, fine particle size −44 mesh powder with a content of 5–10% by weight carbon black. The powder is heat treated in an oxidizing atmosphere to produce a sub-micron size iron oxide powder.

EXAMPLE 8

Production of titanium dioxide

There are presently two major processes for the preparation of titanium dioxide as a pigment. These are the vapor phase chloride process and the wet or liquid phase sulfate process. In the sulfate process, ilmenite ore, comprising largely ferric and titanium oxides, is digested in sulfuric acid. After separation of the iron sulfate, the titanium sulfate is converted to $TiO_2$ by means of a liquid phase hydrolysis process.

The following procedure illustrates a manner of applying the teachings of the present invention to the production of $TiO_2$ by a modified sulfate process.

An aqueous carbon black dispersion is well mixed with a titanium sulfate solution. The resulting mixture is then spray dried. The concentration of carbon black is maintained as low as possible, e.g. about 2% by weight of the mixture. The spray dried mixture is heat treated in an oxygen-containing atmosphere to produce titanium dioxide in finely-divided form.

EXAMPLE 9

Production of ceramic coloring pigments

A new field of color chemistry was opened recently with the publication of data describing the production of a zirconium-vanadium blue. This blue pigment has since become well established in the ceramic industry and there is interest in the possibility of providing other zirconium compounds for the manufacture of ceramic stains. Recent work has related to colors in which vanadium, hafnium, phosphorous, manganese, chromium and titanium are associated with zirconium.

The following example illustrates a manner whereby the process of the present invention is applied to the production of ceramic pigments based on zirconium oxide.

A solution of zirconium acetate is mixed with a solution of vanadium sulfate and an aqueous slurry of carbon black. The resulting mixture is then spray dried and the resulting powder is heat treated at temperatures sufficient to convert the metal compounds to the corresponding oxides.

EXAMPLE 10

Production of colored $TiO_2$ pigments

This example illustrates the application of the teachings of the present invention to a method for producing improved colored titanium dioxide pigments.

A metal compound is dissolved in a dispersion of carbon black. The resulting dispersion is then mixed with an aqueous dispersion of titanium dioxide. The choice of the particular metal compound is determined by the color required. The concentration of metal compound should be sufficient to allow for a concentration of between about 1% and 5% by weight of the corresponding oxide in the finished product. Examples of color possibilities are as follows:

Compounds:
- Nickel — yellow.
- Copper — brown red.
- Iron — brown, red, gray.
- Vanadium — blue.

The titanium dioxide, metal compound and carbon black mixture is spray dried. The spray dried powder is then entrained in an oxidizing gas and conveyed to a high temperature zone wherein the metal compound is converted to the corresponding oxide and substantially all of the carbon black is oxidized. The resulting product is a colored pigment comprised of titanium dioxide having a uniform distribution of the metal oxide on the surface thereof.

It will be obvious from the preceding examples that the process of our invention is highly versatile and may be applied to the production of many metal oxide products of commercial interest. Thus, many modifications in many of the incidental features utilized in illustrating our invention may be introduced without departing from the spirit and scope thereof.

For example, while it is generally required that the carbon black and the metal compound be mixed into a liquid medium and the resulting dispersion be subdivided into discrete droplets and dried, it is obvious that when the carbon black and metal compound are mixed so that the resulting mixture is initially in the form of discrete droplets, further subdivision is entirely unnecessary and the step of "subdividing" can be entirely eliminated.

Having described our invention together with preferred embodiments thereof, what we declare as new and desire to secure by U.S. Letters Patent is as follows:

1. A process for producing finely-divided metal oxides and mixtures thereof comprising the steps of:
   (a) uniformly mixing into a liquid medium
      (1) a metal compound which upon heating will be converted to the corresponding oxide, and
      (2) carbon black,
   (b) spray drying the resulting mixture, thereby evaporating the liquid medium therefrom, and
   (c) heating the resulting particles to a temperature sufficient to convert said metal compound to the corresponding oxide.

2. The process of claim 1 wherein the dry particles produced in accordance with step (b) have an average particle diameter of less than about 200 microns.

3. The process of claim 1 wherein the dry particles produced in accordance with step (b) have an average particle diameter of less than about 60 microns.

4. The process of claim 1 wherein said metal compound is chosen from the group consisting of compounds of boron, silicon, copper, barium, aluminum, titanium, zirconium, tungsten, zinc, lead, tin, iron, cobalt, nickel, manganese, chromium, vanadium, thorium, molybdenum and mixtures thereof.

5. The process of claim 1 wherein said metal compound is a compound of nickel.

6. The process of claim 1 wherein said metal compound is a compound of iron.

7. The process of claim 1 wherein said metal compound is a compound of tungsten.

8. The process of claim 1 wherein said metal compound is a compound of titanium.

9. The process of claim 1 wherein said metal compound is a compound of aluminum.

10. The process of claim 1 wherein said metal compound is water soluble.

11. The process of claim 1 wherein step (c) is accomplished in an oxidizing atmosphere.

12. The process of claim 1 wherein step (c) is accomplished in an inert atmosphere.

13. The process of claim 1 wherein step (c) is accomplished under oxidizing conditions such that the final product is substantially free of carbon black.

14. The process of claim 1 wherein the quantity of carbon black utilized is such that the resulting metal oxide/carbon black composition comprises less than about 10% by weight carbon black.

15. The process of claim 1 wherein step (c) is accomplished at temperatures between about 500° F. and about 2000° F.

16. The process of claim 1 wherein the carbon black utilized has a nitrogen surface area of more than about 70 m.²/gm.

17. The process of claim 1 wherein the carbon black utilized is a thermal carbon black.

18. The process of claim 1 wherein said metal compound is chosen from the group consisting of sulfates, nitrates, acetates and chlorides.

19. The process of claim 1 wherein a mixture of metal compounds is utilized.

References Cited

UNITED STATES PATENTS

| | | | |
|---|---|---|---|
| 3,355,393 | 11/1967 | Swanson | 252—301.1 |
| 2,900,244 | 8/1959 | Bradstreet et al. | 23—183 X |
| 3,171,715 | 3/1965 | Kleinsteuber | 23—345 |
| 3,171,815 | 3/1965 | Kelly et al. | 252—301.1 |
| 3,252,755 | 5/1966 | Delange et al. | |

L. DEWAYNE RUTLEDGE, *Primary Examiner.*